United States Patent
Weifenbach et al.

(10) Patent No.: US 9,751,370 B2
(45) Date of Patent: Sep. 5, 2017

(54) ADJUSTABLE CONTROL ARM

(71) Applicant: Niwot Corporation, Longmont, CO (US)

(72) Inventors: Jesse Aaron Weifenbach, Thornton, CO (US); James Roger Frens, Berthoud, CO (US)

(73) Assignee: NIWOT CORPORATION, Longmont, CO (US)

( * ) Notice: Subject to any disclaimer, the term of this patent is extended or adjusted under 35 U.S.C. 154(b) by 0 days.

(21) Appl. No.: 14/473,848

(22) Filed: Aug. 29, 2014

(65) Prior Publication Data

US 2016/0059652 A1    Mar. 3, 2016

(51) Int. Cl.
    *B60G 7/00*    (2006.01)
    *B62D 17/00*   (2006.01)

(52) U.S. Cl.
    CPC .......... *B60G 7/003* (2013.01); *B60G 7/005* (2013.01); *B62D 17/00* (2013.01); *B60G 2204/143* (2013.01); *B60G 2204/148* (2013.01); *B60G 2204/416* (2013.01); *B60G 2206/124* (2013.01)

(58) Field of Classification Search
    CPC .... B60G 7/003; B60G 7/005; B60G 2200/46; B60G 2200/462; B60G 2200/4622; B60G 2206/1112; B62D 17/00
    See application file for complete search history.

(56) References Cited

U.S. PATENT DOCUMENTS

| | | | |
|---|---|---|---|
| 1,573,782 A * | 2/1926 | Portis .................. | B60G 7/00 267/66 |
| 1,643,970 A * | 10/1927 | Wilkins ................ | B60G 7/005 267/66 |
| 2,115,915 A * | 5/1938 | McCain ................ | B62D 17/00 280/124.14 |
| 4,267,896 A | 5/1981 | Hendriksen | |
| 4,616,845 A | 10/1986 | Pettibone | |
| 5,080,388 A | 1/1992 | Berry et al. | |
| 5,267,751 A * | 12/1993 | Hiromoto .............. | B60G 3/10 280/124.134 |
| 5,398,411 A | 3/1995 | Kusaka et al. | |
| 5,564,521 A * | 10/1996 | McLaughlin .......... | B60G 9/00 180/352 |
| 5,649,719 A * | 7/1997 | Wallace ................. | B60G 7/02 180/352 |
| 6,231,264 B1 * | 5/2001 | McLaughlin ........ | F16C 11/0614 180/352 |
| 6,267,388 B1 * | 7/2001 | Atkinson .............. | B60G 3/20 280/124.103 |

(Continued)

*Primary Examiner* — Paul N Dickson
*Assistant Examiner* — Timothy Wilhelm
(74) *Attorney, Agent, or Firm* — Dorsey & Whitney LLP

(57) ABSTRACT

Discussed herein is an adjustable control arm that includes a first arm and a second arm that may be independently adjustable relative to one another. The first arm and the second arm may have intersecting axes that pass though the kinematic center of joints located at both ends of each arm. The control arms are adjustable allowing for variable positioning of the joint located at the intersection of the axes. The control arms may pivot relative to one another at the intersection of their axes. The connection of the control arms may also house a ball joint minimizing the height of the connection with the ball joint.

24 Claims, 10 Drawing Sheets

(56) References Cited

U.S. PATENT DOCUMENTS

| | | | | |
|---|---|---|---|---|
| 6,305,699 | B1* | 10/2001 | Konig | B60G 7/001 280/124.133 |
| 6,612,593 | B2* | 9/2003 | Mikasa | B60G 3/06 280/124.134 |
| 6,966,567 | B2* | 11/2005 | McLaughlin | B60G 7/003 280/93.51 |
| 7,188,850 | B2* | 3/2007 | Ziech | B60G 9/00 280/124.125 |
| 7,278,648 | B2* | 10/2007 | Bobbitt, III | B60G 7/003 280/124.123 |
| 7,798,503 | B2* | 9/2010 | McLaughlin | B60G 7/003 180/352 |
| 7,850,178 | B2* | 12/2010 | Fischer | B60G 7/003 280/86.758 |
| 8,205,896 | B2* | 6/2012 | Gell | B60G 3/20 280/124.135 |
| 8,356,839 | B1 | 1/2013 | Vey | |
| 8,746,714 | B2 | 6/2014 | Frens | |
| 8,783,993 | B2* | 7/2014 | Brunneke | B60G 7/001 280/93.51 |
| 2003/0111812 | A1* | 6/2003 | Carlstedt | B60G 7/006 280/124.16 |
| 2004/0108672 | A1 | 6/2004 | Enck | |
| 2005/0017471 | A1* | 1/2005 | Kim | B60G 7/02 280/86.751 |
| 2005/0156398 | A1 | 7/2005 | Ramsey | |
| 2006/151968 | A1* | 7/2006 | Kim | B60G 7/02 280/86.757 |
| 2007/0013171 | A1 | 1/2007 | Tuthill et al. | |
| 2011/0036672 | A1* | 2/2011 | Kramer | B60G 7/003 188/269 |
| 2012/0104716 | A1* | 5/2012 | Hintzen | B60G 7/003 280/124.135 |

* cited by examiner

ADJUSTABLE CONTROL ARM

TECHNICAL FIELD

The present disclosure relates to suspension systems for vehicles and, more particularly, multi-piece control arms with each arm rotatable relative to the other at the ball joint such that the angle between the arms is adjustable by elongating or shortening the arms without removal of the control arm from the vehicle.

BACKGROUND

Vehicles often include a suspension system to aid in regulating the vehicle's ride and handling. Many suspension systems include control arms, which connect a wheel assembly to the frame and/or body of a vehicle. The geometry of a control arm varies from vehicle to vehicle. The geometry of the control arm may also vary depending on the desired ride and handling characteristics and overall suspension design. The geometry of a control arm may determine the angle of the wheel in relation to a road surface, for example camber, caster, or toe.

Camber angle is a measure of how much a wheel and tire assembly on a vehicle leans or tilts, either inward toward, or outward from, the vehicle, when viewed from the front or back. As such, the camber angle can be defined in different ways by measuring the relative positions of various components on a vehicle. Where the wheel/tire assembly is tilted such that the upper part of the wheel/tire assembly is closer to the centerline of the vehicle than the bottom of the tire, the camber is said to be negative. Where the top of the wheel/tire assembly is farther from the centerline of the vehicle than the bottom of the tire, the camber angle is said to be positive.

The caster angle is typically defined by the angle between a vertical line and a line drawn through upper and lower steering pivots, as viewed from either side of the vehicle. As such, the caster angle can be defined in different ways by measuring the relative positions of various components on a vehicle. For example, the caster angle can be defined as the angle between a vertical line and a caster reference line drawn either through an upper strut mount and a lower ball joint or through an upper ball joint and the lower ball joint.

The toe angle is typically defined by the angle between a horizontal line drawn down the centerline of the vehicle and a line drawn perpendicular to the center axis of the tire and wheel assembly as viewed from either above or below. As such, the toe angle can be defined in different ways by measuring the relative positions of various components on a vehicle. Where the forward edge of the wheel/tire assembly is closer to the mid-plane of the vehicle than the back edge, the toe angle is said to be positive. Where the forward edge is farther from the mid-plane, the toe angle is said to be negative.

Automotive manufacturers publish specifications for camber, caster, and toe for each model of vehicle. Many vehicles are designed with a means of adjustment of these alignment angles for use in vehicle maintenance, but some vehicles are designed without a built in adjustment or insufficient adjustment to achieve desired settings. Adjustment of the camber, caster, and toe angles will affect tire wear and handling characteristics of a vehicle. For example, camber may be altered to allow for differing cornering characteristics. In some cases, these angles, and therefore a vehicle's handling characteristics, may be adjusted by choosing control arms having different geometry. In addition, when replacing damaged, worn out, or factory-installed control arms with new control arms, the new control arm may have a slightly different geometry. Changing of control arms on a vehicle often requires difficult and time-consuming adjustments. Thus, a vehicle owner may choose to forego correcting undesirable ride and handling characteristics to avoid the expense and difficulty of servicing control arms. Alternately, there are adjustable control arms on the market that can change the wheel alignment angles to a desired setting, however these arms may violate factory fit and form or they may give up arm strength in order to achieve change.

What is needed is an adjustment mechanism that allows a vehicle owner or technician to alter control arm geometry to fit different vehicles and/or to easily alter the alignment parameters—and thus handling and/or tire wear of a vehicle without the need to remove or exchange a control arm. Additionally a control arm that is easily adjustable should be provided in a package similar to the original-equipment control arm to avoid contact with other parts of the vehicle. The design of a control arm should be such that inherent strength is maximized by eliminating or minimizing unnecessary loading upon the internal structure of the arm, thus optimizing mass, volume, and/or material strength requirements.

The adjustable control arm presented here provides for adjustment of control arm geometry—and thus vehicle alignment angles—via a multi-piece structure, which may avoid the need to remove the wheel assembly and/or the control arm from the vehicle while maintaining a minimal package space in the wheel well. Furthermore, the adjustable control arm presented here maximizes strength of the control arm assembly by directing the vehicle's dynamic motion forces along the axes of the adjustment mechanism.

SUMMARY

In accordance with various embodiments, an adjustable control arm may include a first arm. The first arm may have a first flexible joint and a first joint section connected by a first link that is independently adjustable in length. The adjustable control arm may include a second arm having a second flexible joint and a second joint section connected by a second link that is independently adjustable in length. The adjustable control arm may include a joint assembly including at least a portion of the first joint section and a portion of the second joint section. The joint assembly may be positionally adjustable without incurring binding between the first arm and the second arm. The adjustment may be provided by changing the length of either or both of the first link and the second link.

In various embodiments, the first joint section and the second joint section may be rotatable relative to one another providing adjustment of the angle between the first arm and the second arm. The first link may include an adjustment section operable to change the length of the first link. The second link may include an adjustment section operable to change the length of the second link. The first joint section may include a first joint head housing at least a portion of the joint assembly in an internal chamber. The first joint section may have a first section mating surface associated with a first section alignment feature. The second joint section may include a second joint head with a second section mating surface surrounding an aperture defined by an alignment feature. The second joint head may include a second section alignment feature. The first section alignment feature and the second section alignment feature may be engaged thereby aligning the second joint head and the first joint head and providing rotational engagement between the second joint head relative to the first joint head. The joint assembly may extend from the internal chamber and pass through the aperture. The first flexible joint may include a flexible member having a spherical shaft to increase adjustably of the first arm.

In various embodiments, the first arm may include a first axis. The second arm may include a second axis. The first axis and the second axis may both intersect one another. The joint assembly may include a spherical center. The first axis and the second axis may both intersect at the spherical center of the joint assembly. The first axis may intersect the spherical center of the flexible member located within the flexible joint. The second axis may intersect the spherical center of the second flexible member located within the flexible joint. In accordance with various embodiments, the adjustment section may include opposing threads on each of its ends. The threads on each end may engage corresponding threads on the first joint section and the flexible joint such that the adjustment section forms a turnbuckle between the first joint section and the flexible joint. The first arm may include a locking mechanism operable to limit movement of the adjustment section.

In accordance with various embodiments, an upper control arm joint may include a first joint section having a first joint head, that is operable rotate about an axis. The upper control arm joint may include a second joint section having a second joint head that is operable to rotate about the axis and engage in rotational movement relative to the first joint head. The first joint head and the second joint head may each be operable to receive at least one of a ball joint or a stud with the at least one of the ball joint or the stud having a central axis. The axis may be at least one of a steering axis or the central axis.

In various embodiments, the first joint head may house at least a portion of a joint assembly in an internal chamber. The first joint section may have a first section mating surface associated with a first section alignment feature. The second joint head may have a second section mating surface surrounding an aperture defined by an alignment feature and a second section alignment feature. The first section alignment feature and the second section alignment feature may be engaged, aligning the second joint head and the first joint head along the axis. The joint assembly may extend from the internal chamber and passes through the aperture. The first joint head may include a first engagement portion which engages with a first link to form a first adjustably fixed geometry that is adjustable by manipulating the engagement between the first engagement portion and the first link. The second joint head may include a second engagement portion which engages with a second link. The engagement between the second engagement portion and the second link may form a second adjustably fixed geometry that is adjustable by manipulating the engagement between the second engagement portion and the second link. The first engagement portion may define a first axis. The second engagement portion may define a second axis with the first axis and the second axis intersecting. The first engagement portion may be a first threaded shaft which extends from a side of the first joint head. The second engagement portion may be a second threaded shaft which extends from a side of the second joint head. The adjustment between the first engagement portion and the first link may occur by threading the first engagement portion into the first link. The adjustment between the second engagement portion and the second link may occur by threading the second engagement portion into the second link. An angle between the first threaded shaft and the second threaded shaft may be adjustable by rotating the second joint head relative to the first joint head.

In various embodiments, the first section alignment feature may be a cylindrical protrusion extending from the mating surface with a center aperture. The joint assembly may extend through the center aperture. The aperture may be defined by a circumferential wall and is sized to receive the first section alignment feature. The circumferential wall may be the second section alignment feature with the first section alignment feature and the second section alignment feature being coaxial allowing rotation between each alignment features.

In various embodiments, the joint may further include a joint boot sandwiched between the first joint section and the second joint section. The joint may further include an annular protrusion extending from the aperture. The annular protrusion may support and compress the ball joint boot against the first joint section. The second joint section may further include a slot forming an extension to the aperture. A second aperture may be perpendicular to and extend through the slot operable to receive a pinch bolt and contract the two sides of slot together to decrease the size of the aperture to tightly fit the second section alignment feature around the first section alignment feature.

DETAILED DESCRIPTION

Aspects of the subject matter discussed herein include the use of an adjustable control arm that includes a first arm having an end with a flexible joint and an end that forms a part of a joint, the two ends connected by a link therebetween. The adjustable control arm may also include a second arm having a flexible joint on one end and a second end that forms a part of a joint, the two ends connected by a link therebetween. The adjustable control arm may also include a joint assembly having at least a portion of the joint assembly contained between the first joint section and the second joint section. The first joint section and the second joint section may be mated to one another capturing the joint assembly and forming an end of the control arm. In this structure the first arm is rotatable relative to the second arm. This relationship may provide adjustment of the angle between the first arm and the second arm.

The adjustments of the various arms may affect the camber, caster, or toe in of the vehicle. While these adjustments may be generally to the front wheels on a vehicle as generally discussed herein, the principles, devices, and methods may be similarly suited to and used on the rear wheels of a vehicle and adapted for that purpose. For example, it may be desirable to adapt the control arm to the rear wheel suspension of the vehicle and benefit from the weight savings, size reduction, and/or adjustability. This adaptation may, for example, allow simplified adjustment of the camber on the rear wheels. However, the control arm may also be used for a steering suspension such as that on the front of the vehicle by attaching one end of the control arm to the chassis and the other end to the steering knuckle.

Figure 1:
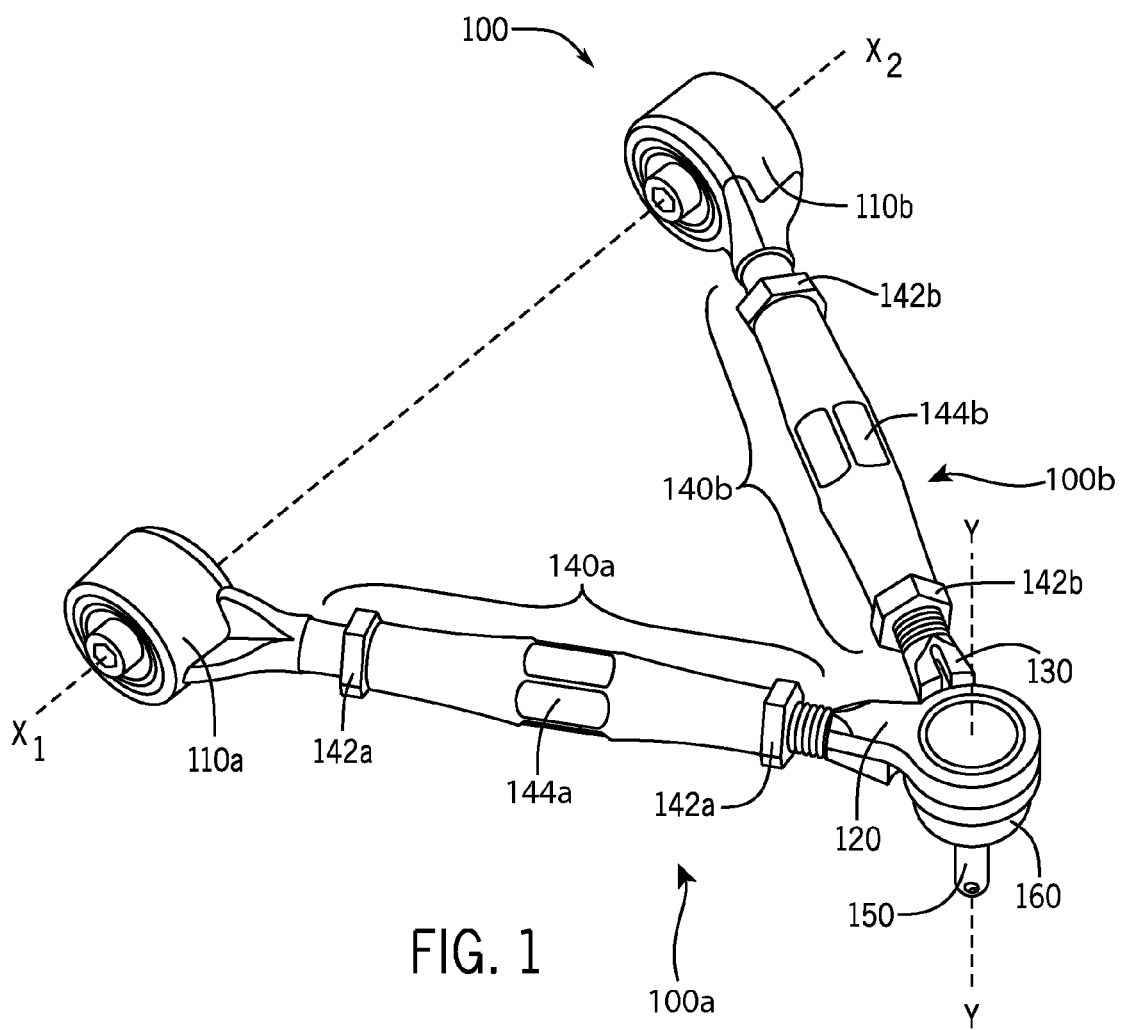
FIG. 1 is a perspective view of an embodiment of an adjustable control arm having independently-adjustable connected arms.
Figure 2:
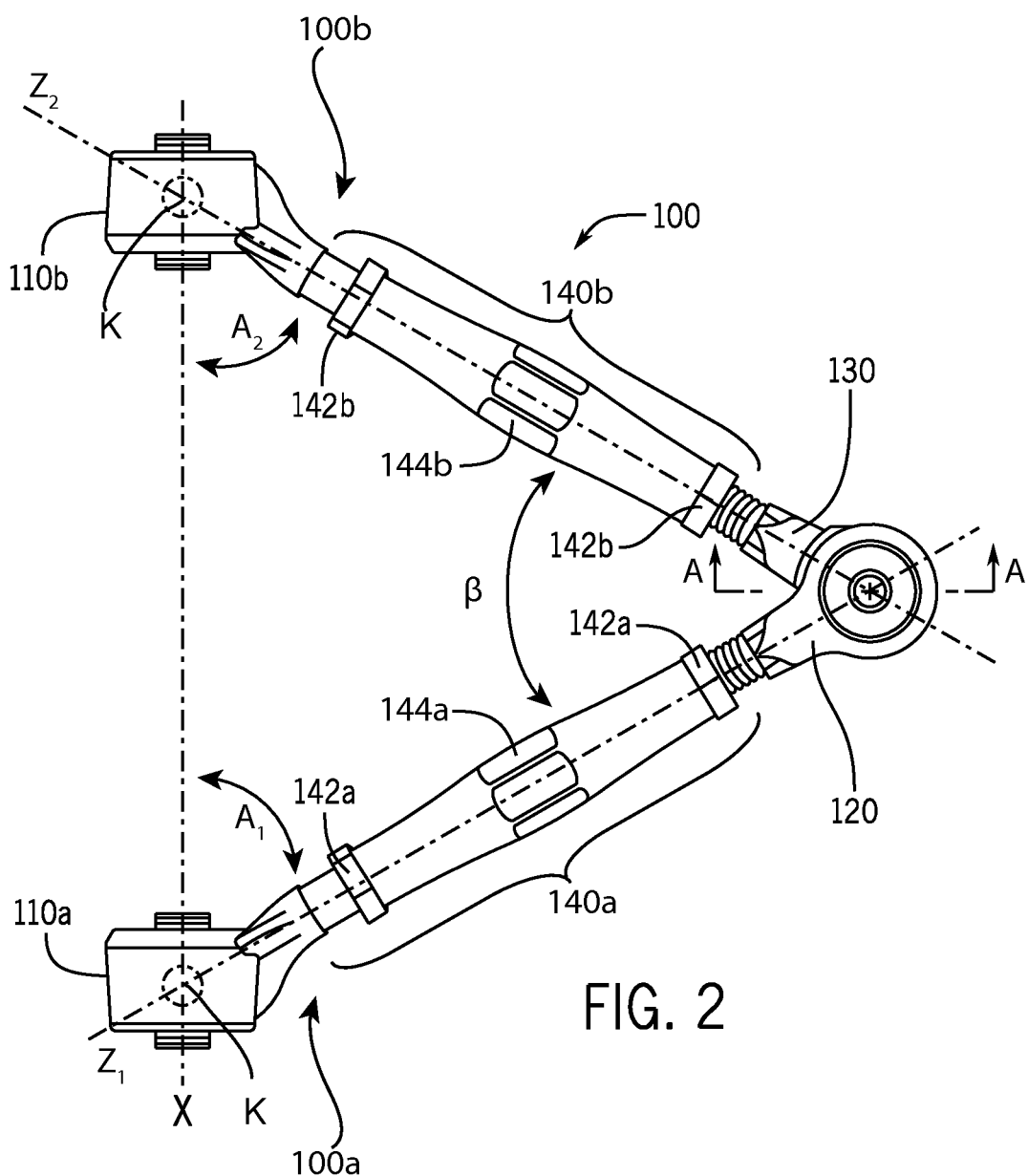
FIG. 2 is a top view of the control arm of FIG. 1.

In accordance with various embodiments, as illustrated in FIGS. 1 and 2, an adjustable control arm 100 may include a first control arm 100a and a second adjustable control arm 100b. The first control arm 100a and the second adjustable control arm 100b may be independent separable arms connected at a single engagement. Each of the control arms 100a/100b may have one or more adjustment features. For example, each of the control arms 100a/100b may be angularly adjustable relative to a mounting point, as indicated in FIG. 2, by changing angles $A_1$ or $A_2$. In another example, each of the control arms 100a/100b may be angularly adjustable relative to one another, as indicated in FIG. 2, by changing angle B. In another example, each of the control arms 100a/100b may be adjustable in length. In still another example, the adjustable control arm 100 may include any combinations of each of these adjustable attributes. These adjustable attributes may allow for adjustment of the single engagement which connects the first and second control arms. The single engagement may include or connect with a joint assembly such as a ball joint 150. As such, the outboard ball joint 150 may be adjustable laterally and/or longitudinally with respect to the vehicle that the control arm 100 is mounted on.

Figure 3:
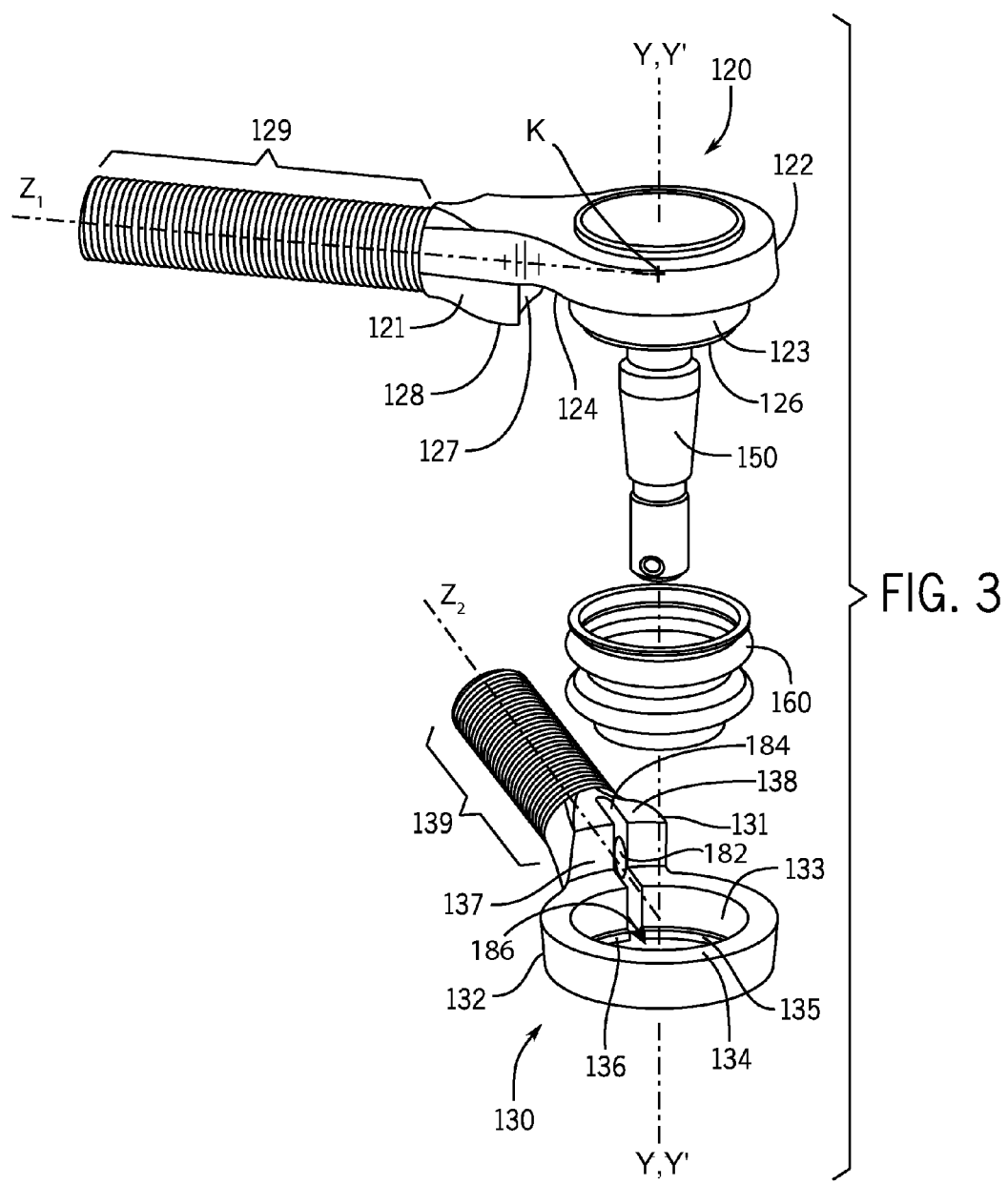
FIG. 3 is an exploded view of a portion of the control arm of FIG. 1 which would, for example, attach to the knuckle, hub or wheel assembly of a vehicle.
Figure 4:
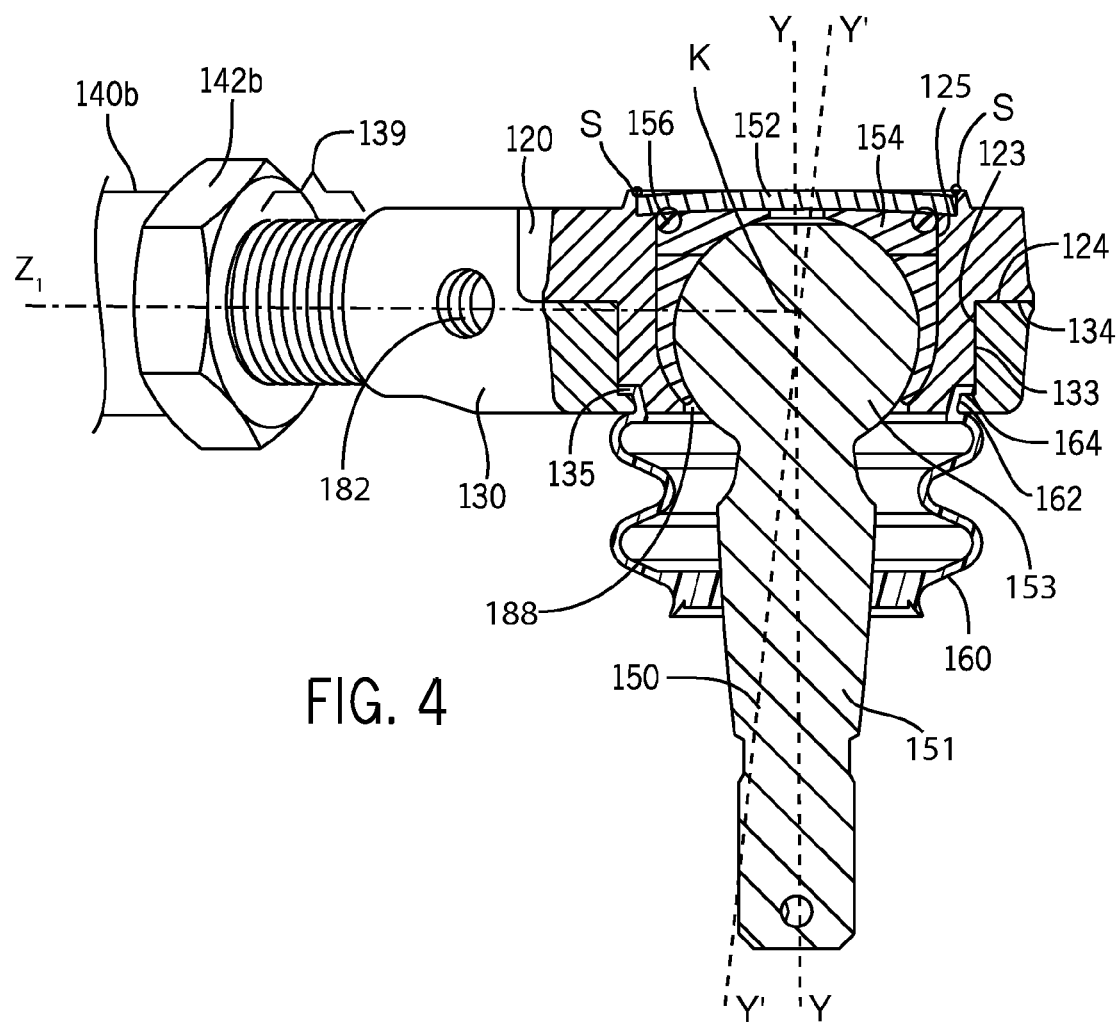
FIG. 4 is a section view of the control arm of FIG. 2 along line A-A.

The control arm 100a may include a flexible joint 110a, a link 140a, and the first joint section 120. The link 140a may connect the flexible joint 110a to the first joint section 120. The adjustable control arm 100b may include a flexible joint 110b, a link 140b, and a joint section 130. The link 140b may connect the flexible joint 110b to the second joint section 130. The first joint section 120 and the joint section 130 may be connected. In various embodiments, the first joint section 120 and the joint section 130 may be a rotatable connection. By having the joint sections 120 and 130 be separate parts from the links 140a and 140b respectively the In accordance with various embodiments, as illustrated in FIG. 3, the first joint section 120 may include a joint head 121. The joint head 121 may include an internal chamber 125 (shown in FIG. 4). The chamber may be substantially enclosed, substantially open, an aperture including a tapered or straight cylindrical through hole, a blind hole or any other configuration suitable to receive a joint (e.g. a ball joint) such as those discussed herein. A spherical portion of the joint (e.g. spherical interface 153) may be physically contained within the internal chamber 125 as shown in FIG. 4.

Figure 8A:
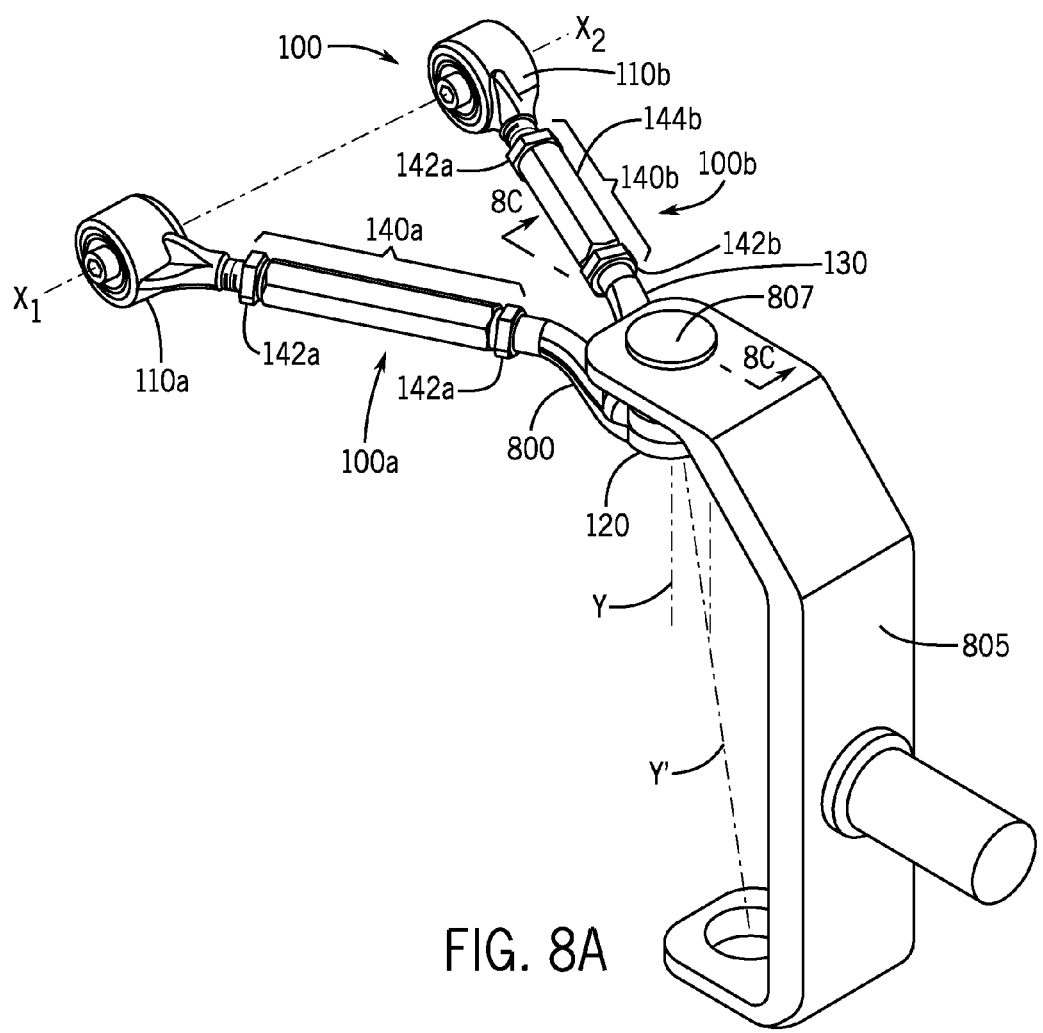
FIG. 8A is a perspective view of an embodiment of an adjustable control arm having independently-adjustable connected arms and connected to a ball joint with the spherical portion positioned in a knuckle of a vehicle in accordance with one embodiment.
Figure 8B:
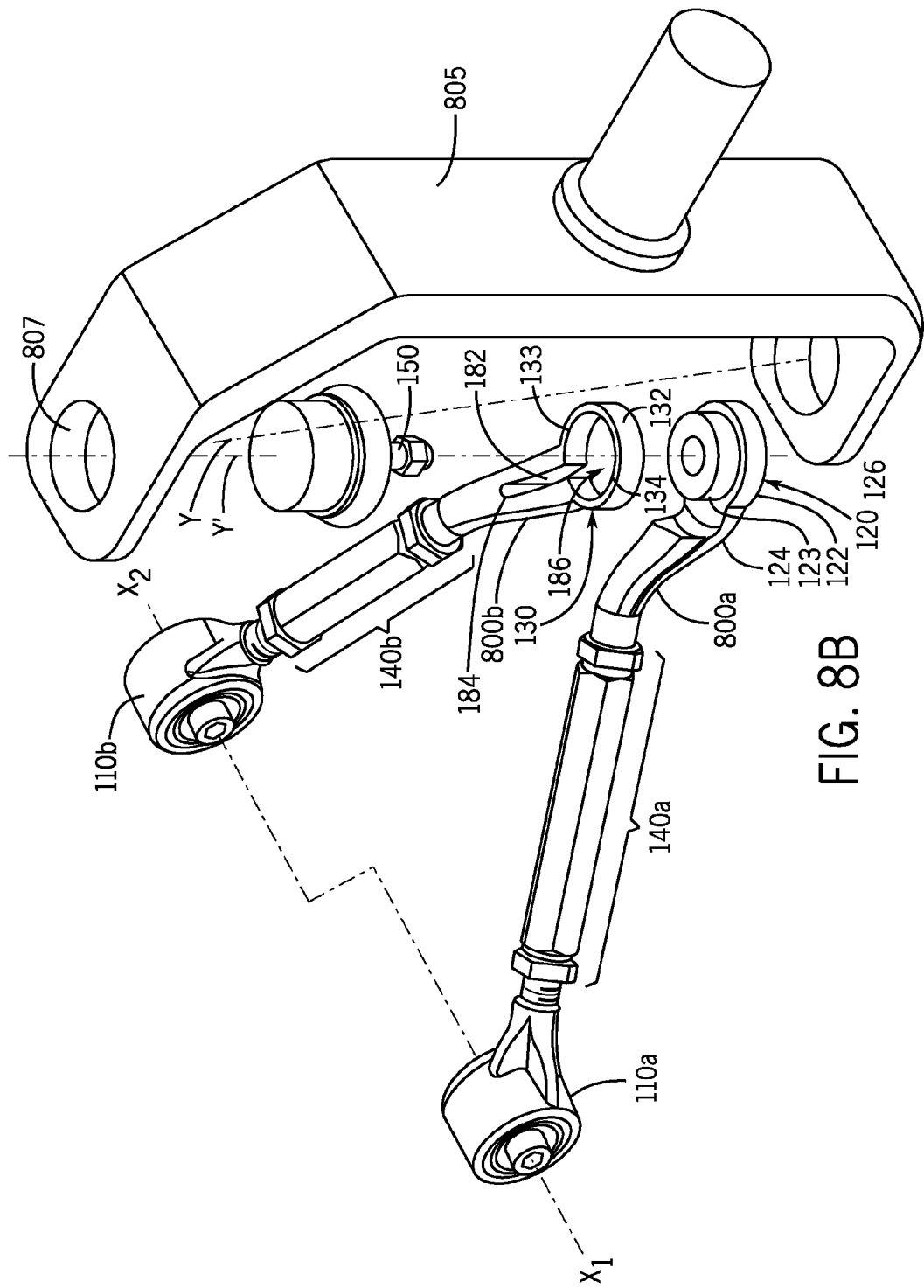
FIG. 8B is an exploded view of a portion of the control arm of FIG. 8A which would, for example, attach to the knuckle of a vehicle with a ball joint positioned in the knuckle.
Figure 8C:
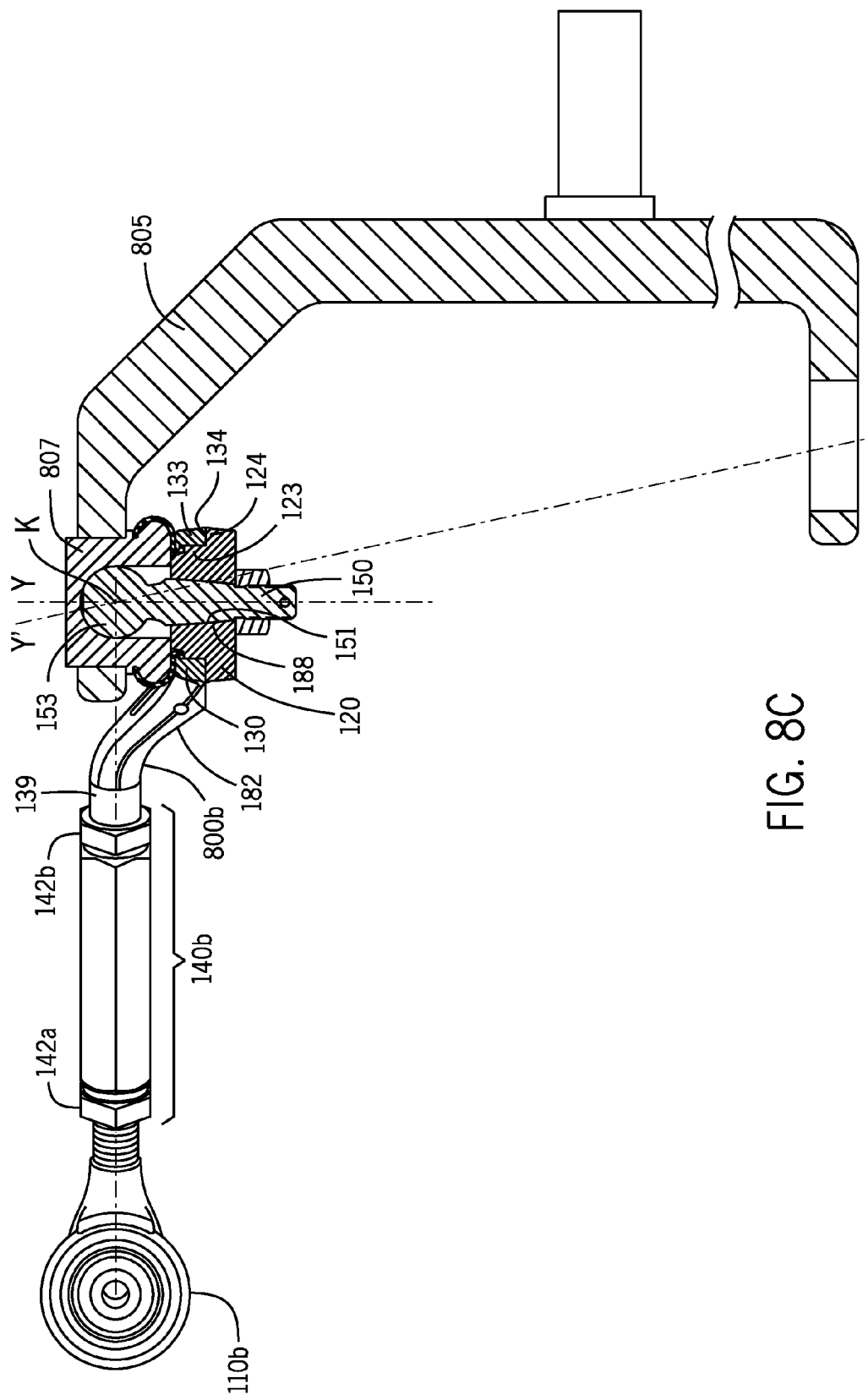
FIG. 8C is a section view of the control arm of FIG. 2 along line D-D.

In accordance with various embodiments, the ball joint may be a part of the knuckle on the vehicle and the joint head merely receives a tapered/straight stud forming part of the ball joint extending from the knuckle. FIGS. 8A-C shows an example of the upper control arm 100 receiving a stud as opposed to housing the ball joint 150. In one example, the internal chamber 125 may be defined by an aperture 188 (shown in FIG. 4) that extends through the joint head 121. The internal chamber 125 may be sized and operable to receive a portion of the joint assembly 150. Specifically the aperture 188 may receive a shaft or stud 151. In this example, the spherical portion 153 of joint assembly 150 is housed in a cavity 807 located in a knuckle 805 that forms part of the vehicle. In various embodiments, the center line of the shaft or stud 151 may not be aligned with the Y or Y' axis. Alternatively, the center line of the shaft or stud 151 may be aligned with the Y or Y' axis.

In various embodiments, the internal chamber 125 may include a larger diameter opening on a first side of the joint head 121 and a smaller diameter opening on a second side of the joint head 121. These configurations may limit or prevent the entire joint assembly 150 from being removed through the smaller diameter opening. In other embodiments, the internal chamber 125 may be sized such that the joint assembly 150 may be allowed to pass entirely through the internal chamber 125. In various embodiments, the joint assembly 150 may extend out of one side or both sides of the internal chamber 125.

The joint assembly 150 may include any of a variety of suspension joints. In accordance with various embodiments, these suspension joints may include joints having spherical interfaces allowing multiple degrees of freedom for relative motion. Such joints may handle dynamic loads by functioning in single shear ('stud type') or double shear ('cross axis') or any other known configurations of joints. The joint assembly 150 may include cartridge ball joints which may be assembled as press-in joints, screw-in joints, snap-in joints, or any other assembly of joints including non-cartridge ('integral') configurations as shown in FIG. 4. The joint assembly 150 may include a shaft 151 received within a race 154. The race 154 may be any variety of bushing, surface, bearing or the like to build tolerance, improve ware, or provide shock absorbance of the joint assembly 150. The race may be any material including metal (e.g. brass) or polymer (e.g. nylon). The shaft 151 may be any form of protrusion, pin, bolt, stud, etc. extending from or through the joint assembly 150. The shaft 151 may also include a through hole extending through the shaft 151 and spherical interface 153 allowing the joint assembly 150 to receive a stud. The shaft 151 may include an internal or external taper, a threaded section and/or any feature operable to engage the joint assembly to an external vehicle mechanism such as a knuckle.

The race 154 and the shaft 151 assembly may be received within the internal chamber 125. At least a portion of the shaft 151 may extend through the opening 188 on the second side of the joint head 121. In some embodiments, this opening 188 may restrict the joint assembly 150 from being removed from the internal chamber 125. In other embodiments, this opening 188 may be sufficiently large to allow removal of the joint assembly 150 from the internal chamber 125. The joint assembly 150 may be sealed on the first side of the joint head 121 with a retainer 152 such as a cap. The joint assembly 150 may be permanently enclosed or removably enclosed within the internal chamber 125. For example, the opening may be permanently enclosed by swaging the opening closed around the retainer 152 (e.g. a cap), thereby trapping the race 154 and/or joint assembly 150 within the internal chamber 125. The swaged material "S" is shown in FIG. 4. Alternatively, the opening may be temporarily closed by using a retainer. For example, the race 154 may be held in the internal chamber 125 with a retainer 152. The retainer 152 may be any device suitable for retaining the race 154. For example, a snap ring may retain the race 154. Alternatively or in addition to a snap ring, a cap, or other retainer, an O-ring 154 may be positioned between the retainer 152 and race 154 to reduce build tolerance and prove some preload on the joint assembly 150 or further seal the joint assembly 150. Through this structure each of the parts of the joint assembly 150 may be loaded and/or removed from the top of the joint head 121.

In accordance with various embodiments, the joint assembly 150 may be a cross axis joint (i.e. double-shear attachment to knuckle/wheel assembly) or a 'studded' (single shear) joint. Accordingly, the joint assembly 150 may be used without a bushing decreasing components that ware out without significantly sacrificing, tolerance buildup, ware resistance, decrease in comfort from the suspension, or without losing isolation of bushing. In accordance with various embodiments, the shaft 151 may include a spherical interface 153 which may be housed at least partially within joint head 121. The spherical interface 153 may allow for example, from 0° to about 22° off center axis alignment (e.g. axis Y as shown in FIG. 3). In accordance with various embodiments, the spherical interface 153 may include a stud which may be received into a tapered or pinch hole on another suspension component such as an automobile knuckle.

In addition to housing at least a portion of the joint assembly 150, the joint head 121 may be defined by a body portion 122 which forms the structure of the joint head 121 around the internal chamber 125. The joint head 121 may include a neck 128 which extends from one side of the body portion 122. The neck 128 may form a taper from the body portion 122 to an engagement portion 129. The engagement portion 129 may be operable to connect with the link 140a. The engagement portion 129 may engage with the link 140a to form a first adjustably fixed geometry. The adjustably fixed geometry may be any geometry, e.g. length, that is fixed in a first geometry and then adjustable to a different geometry. The adjustment may occur by manipulating the engagement between the engagement portion 129 and the link 140a. This engagement may include, for example, shims, cams (e.g. see Patent Pub. No. 2012/0104713) multiple holes with corresponding locking pins, threaded interfaces, etc. In one example, the engagement portion 129 may include threads which may be located either internally or, as shown in FIGS. 3 and 4, externally. The engagement portion 129 may be generally cylindrical having an axis $Z_1$. The joint head 121 may include a section alignment feature 123 which may be operable to engage with the joint section 130. In one example, the section alignment feature 123 may be a protrusion that extends from the body portion 122. The section alignment feature 123 may form a protruding wall around the internal chamber 125, the internal chamber 125 forming an aperture 188 in the alignment feature 123. The joint head 121 may include a mating surface 124 which may be operable to mate with a corresponding surface forming a part of the joint section 130. The mating surface 124 may form the surface from which the section alignment feature 123 protrudes. The mating surface 124 may be approximately in line with (i.e. approximately contiguous with) axis $Z_1$. In other embodiments, axis $Z_1$ and the mating surface 124 may be parallel but offset from one another. The joint head 121 may include a recess wall 127 which may be positioned perpendicular and/or merely intersecting with the mating surface 124. The recess wall 127 along with the mating surface 124 and the section alignment feature 123 may define a receiving channel operable to receive the joint section 130 into the first joint section 120. The exploded view shown in FIG. 3 illustrates an assembly that allows for a pivoting structure that minimizes total height stickup of components, especially when compared to traditional control arm setups (i.e. the distance from the joint assembly 150 to the top of the body portion 122 is minimized.)

In accordance with various embodiments, as illustrated in FIG. 3, the joint section 130 may include a joint head 131. The joint head 131 may have a body portion 132. The joint head 131 may include an aperture 186 which extends through the body portion 132. The aperture 186 may be sized and operable to receive the joint head 121. For example, the aperture 186 may receive the section alignment feature 123. In various embodiments, the joint assembly 150 may extend through and out of the aperture 186. The aperture 186 may be defined by a section alignment feature 133. The section alignment feature 133 may be a cylindrical surface operable to mate with the surface forming the exterior of the section alignment feature 123. The joint section 130 may include a section mating surface 134. The section mating surface 134 may be operable to mate with the mating surface 124.

The joint head 131 may include a neck 138 which extends from one side of the body portion 132. The neck 138 may form a taper from the body portion 132 to an engagement portion 139. The engagement portion 139 may be operable to connect with the link 140b. The engagement portion 139 may engage with the link 140b to form a first adjustably fixed geometry. The adjustably fixed geometry may be any geometry, e.g. length, that is fixed in a first geometry and then adjustable to a different geometry. The adjustment may occur by manipulating the engagement between the engagement portion 139 and the link 140b. This engagement may include, for example, shims, cams (e.g. see Patent Pub. No. 2012/0104713) multiple holes with corresponding locking pins, threaded interfaces, etc. In one example, the engagement portion 139 may include threads which may be located either internally or, as shown in FIGS. 3 and 4, externally. The engagement portion 139 may be generally cylindrical having an axis $Z_2$.

The joint head 131 may include the section mating surface 134 which may be operable to mate with a corresponding surface forming a part of the first joint section 120, e.g. the mating surface 124. The section mating surface 134 may form the surface approximately perpendicular to and surrounding the aperture 186. The section mating surface 134 may be approximately in line with (i.e. approximately contiguous with) axis $Z_2$. In other embodiments, axis $Z_2$ and the section mating surface 134 may be parallel but offset from one another. The joint head 131 may include a recess wall 137 which may be positioned perpendicular to and/or merely intersecting with the section mating surface 134 and defining a boundary of the neck 138 proximal to an edge of the section mating surface 134. The offset between the section mating surface 134 and an offset relative to the outer surface of the neck 138 provides for the ability to nest the first joint section 120 and the joint section 130 together in response to mating the section mating surface 134 and the mating surface 124.

The ball joint assembly 150 may have a kinematic center K (e.g. the rotational center of a spherical interface 153 shown in FIG. 4), an effective center (i.e. approximately specific point of the rotational center or the generically larger volume around the intended rotational center which includes any point that the joint might rotate about, applicable to spherical and non-spherical joints), or an envelope (i.e. the internal volume of the joint or other element which may include both the kinematic center K and the effective center). Similarly, the flexible joints 110a and 110b may likewise have kinematic centers K, effective centers, and/or envelopes.

As shown for example in FIG. 2, axis $Z_1$ may extend between the flexible joint 110a and the joint 150. Axis $Z_2$ may extend between the flexible joint 110b and the joint 150. The axes $Z_1$ and $Z_2$ may extend between at least one of the kinematic center K, the effective center, or the envelopes of the respective flexible joints 110a, 110b, and 150. In various embodiments, the axes $Z_1$ and $Z_2$ may not form the center of the respective cylindrical engagement portions. In embodiments in which there is misalignment between the engagement portions and the flexible joints the axes $Z_1$ and $Z_2$ may pass through any portion (e.g. the envelope) of the respective engagement portions.

In various embodiments, the axes $Z_1$ and $Z_2$ may intersect each other at the kinematic center K of the joint 150. In another embodiment, the axes $Z_1$ and $Z_2$ may intersect each other at the effective center of the joint 150. In another embodiment, the axes $Z_1$ and $Z_2$ may intersect each other within the envelope of the joint 150. In accordance with various embodiments, axis $Z_1$ and axis $Z_2$ may intersect. As a function of this geometry, the intersection of axis $Z_1$ and axis $Z_2$ places them in the same plane or approximately the same plane. In various examples, the axis $Z_1$ and the axis $Z_2$ may be coplanar with the section mating surface 134 and the mating surface 124, when the section mating surface 134 and the mating surface 124 are mated.

In accordance with various embodiments, the $Z_1$ axis may intersect with the kinematic center K of the flexible joint 110a. The $Z_2$ axis may intersect with the kinematic center K of the flexible joint 110b. By aligning the $Z_1$ between the flexible joint 110a and the ball joint assembly 150 and having $Z_1$ pass through their respective kinematic centers K and aligning $Z_2$ between the flexible joint 110b and the ball joint assembly 150 and having $Z_2$ pass through their respective kinematic centers K, the forces in the corresponding arms 100a and 100b are reduced to compressive and tensile forces without (or limited) bending forces therein. This design may strengthen the upper control arm structure over traditional structures by eliminating or reducing the presence of the bending forces.

In accordance with various embodiments, the kinematic center K of the ball joint assembly 150 may be proximal to the plane formed by the mating surfaces 124 and 134. Alternatively, the kinematic center K may be offset from the plane formed by the mating surfaces 124 and 134. Even in response to the kinematic center K being offset from the mating surfaces 124 and 134, the axis $Z_1$ and axis $Z_2$ may intersect at the kinematic center K. Additionally, in examples with the axis $Z_1$ and the axis $Z_2$ being similarly offset from the section mating surface 134 and the mating surface 124, the mating of the section mating surface 134 and the mating surface 124 similarly locates the axis $Z_1$ and the axis $Z_2$ in the same plane. With the axis $Z_1$ and the axis $Z_2$ intersecting, the links 140b/a attached to the first and second joint section 120/130 and coaxial or in alignment with the axis $Z_1$ and the axis $Z_2$ may also be located in a similarly planar configuration (noting the links 140a/b are actually 3-dimensional, their relationship is merely analogized as being coplanar). The links 140a/b may have features or surfaces that are coplanar in embodiments in which they are not cylindrical but are instead flat.

Some shapes of links 140a/b and/or arms 100a/b may not be conducive to being described as having an axis; however, the links 140a/b and/or arms 100a/b may be suitable to be placed in tension and/or compression. These tensile and compressive forces may be described as force vectors extending from the various joints (e.g. 150, 110a, and 110b). As shown in the various figures, these vectors may have directions or positions the same as or similar to axes $Z_1$ and $Z_2$ and may be generally descriptive of the forces within links 140a/b and/or arms 100a/b. In various embodiments, the force vectors may extend along the links 140a/b and/or arms 100a/b in directions that do not coincide with $Z_1$ and $Z_2$. For example, links 140a/b and/or arms 100a/b may be of a shape that is not amenable to being described by an axis such as $Z_1$ or $Z_2$. In another example, the vectors may be parallel to $Z_1$ and $Z_2$. In another example, the vectors may be skew to $Z_1$ and $Z_2$. In each of these various embodiments, the respective vectors may extend along any path within the envelope of the links 140a/b and/or arms 100a/b. While in other examples, in accordance with any of the various embodiments discussed herein, the force vectors may be in any direction within or outside of the envelope of links 140a/b and/or arms 100a/b. In various examples, the vectors may be directional along paths that extend between one end of the links 140a/b and/or arms 100a/b to the other end of the links 140a/b and/or arms 100a/b. In accordance with various embodiments, the vector associated with link 140a and/or arm 100a as described by a compressive or tensile force exerted on link 140a and/or arm 100a intersects with or passes within the proximity of the vector associated with link 140b and/or arm 100b as described by a compressive or tensile force exerted on link 140b and/or arm 100b. The vectors associated with links 140a/b and/or arms 100a/b may also intersect with or pass within the vicinity of one another at the kinematic center K, the effective center, or the envelope of joint 150. Without limiting the scope of the disclosure here in any way due to theory, it is believed that by maintaining these vectors within the envelope of the links 140a/b and/or arms 100a/b the direction of these force vectors relative to the links 140a/b, arms 100a/b, and/or the joints 150, 110a, and 110b may reduce or eliminate the bending loads on the links 140a/b and/or arms 100a/b.

In accordance with various embodiments, descriptive elements (e.g. axes $Z_1$ and $Z_2$, centerlines of the links 140a/b and/or arms 100a/b, and/or the force vectors) may be located in different planes or pass through the respective joints (e.g. 150, 110a, or 110b) at different locations. In various embodiments, the descriptive elements may be located such that the bending loads on the links 140a/b and/or arms 100a/b may be minimized while still allowing for assembly of the control arms in a variety of configurations in different vehicles.

Referring again to the exemplary embodiment illustrated in FIGS. 8A-8C, 140a/b may still be aligned with the kinematic center K even though the kinematic center K may be located in a part other than the joint sections 120 and/or 130. In this example the kinematic center K may be located in the cavity 807 of the knuckle 805 which may be located on the vehicle. The joint sections 120 and/or 130 may receive the stud 151 through aperture 188. However, in this example, because the kinematic center K is located in the knuckle, the mating surfaces 124, 134 of the joint sections 120 and/or 130 may not align with the kinematic center K because of interference caused by the knuckle 807. The joint sections 120 and/or 130 may be offset either above or below (as shown in FIGS. 8A-C) via a step 800. The step 800 may be any structure that offsets the joint sections 120 and/or 130 from the Z1 axis. As shown, the step 800 may be a bracket or cast portion of the joint sections 120 and/or 130 which causes the offset to avoid interference with the knuckle.

However, the links 140*a/b* and/or the adjustment sections 144*a/b* may still reside along the line of axis $Z_1$ and the axis $Z_2$. Stated another way, the adjustment sections 144*a/b* may reside in line between the flexible joints 110*a/b* and the joint assembly 150. In some embodiments, the adjustment sections 144*a/b* may reside in line between the effective centers of the 110*a/b* respectively and the effective center of the joint assembly 150. In some embodiments, the adjustment sections 144*a/b* may reside in line between the kinematic centers K of the flexible joint 110*a/b* respectively and the kinematic center K of the joint assembly 150. In these various embodiments, the line between these various points in the joints may be offset from the location in which the joint sections 120 and/or 130 may engage.

In accordance with various embodiments including those with or without offset joint sections, the engagement between the first joint section 120 and the joint section 130 via the section alignment feature 133 and the section alignment feature 123 may be configured to allow the first joint section 120 and the second joint section 130 to rotate relative to one another. For example, the section alignment feature 133 and the section alignment feature 123 may have a common axis Y. The section alignment feature 133 and the section alignment feature 123 may each be cylindrical, allowing rotation between the two. The common axis Y may be the axis of the joint assembly 150, such as the axis of the stud 151. However, in some embodiments the common axis may be Y'. Y' may be an axis other than that of the stud. For example some vehicles may have a steering axis that is not coaxial with the axis of the stud in the ball joint or the axis of the aperture in a cross axis joint. As such the steering axis may be Y' as shown in FIG. 4. In various embodiments, the section alignment feature 133 and the section alignment feature 123 may be configured to allow the first joint section 120 and the second joint section 130 to rotate relative to one another around a steering axis Y'. In accordance with various embodiments, as shown in FIG. 4, the axis Y and/or Y' may intersect with the kinematic center K of the joint 150. In this manner, the effective center may remain the same (the center of the ball joint) even though the shaft 151 may not be on that axis.

In accordance with various embodiments, the first joint section 120 and second joint section 130 may be actively held together. In various examples, hardware such as snap rings, circle-clips, bolted retainer plates, O-rings etc. may be used to hold both the first and second joint sections 120/130 together. In addition to or as an alternative to utilizing hardware, the diameter of the aperture 186 may be decreased to more tightly engage the section alignment feature 123. For example, the joint section 130 may include a slot 184 that intersects with the aperture 186 defined by the section alignment feature 133. An aperture 182 may be perpendicular to and extend through the slot 184. The aperture 182 may be operable to receive a pinch bolt configured to contract the two sides of slot 184 and force them together, thereby decreasing the diameter of the aperture 186. The pinch bolt may also engage the first joint section 120 directly or indirectly (as shown) to positively hold the first joint section 120 to the joint section 130. Additionally, the compressive force between joint assembly 150 and the vehicle knuckle effectively traps the joint section 130 so that even if this interface were to become loose in service, the joint assembly 150 and the joint section 130 remains assembled. This engagement between the first joint section 120 and joint section 130 and/or the engagement of section 130 to the vehicle knuckle provides increased consumer confidence in the product, as it may prevent the arm assembly from coming apart during vehicle operation and/or installation of the control arm, and in addition the first joint section 120 and second joint section 130 may be connected and installed with a loose fit between one another to ease fitting during installation. Furthermore, providing an aperture 186 that is adaptable to the size of the section alignment feature 123 also may lessen the need for precision machining between the joint sections.

In accordance with various embodiments, the first joint section 120 and the joint section 130 could sandwich the ball joint assembly between each other thereby retaining the joint assembly either with or without additional retaining features. In such an embodiment, the joint assembly may extend out of either one or both of the apertures through the first joint section 120 and the second joint section 130. The shaft 151 may extend out of the aperture 186 and out of an aperture in the top of first joint section 120.

In accordance with various embodiments, the joint assembly may include a boot 160, such as a ball joint boot or any other covering operable to keep debris out of and grease in the joint assembly. The joint boot 160 may be sandwiched between the first joint section 120 and the joint section 130. The joint boot 160 may have a lip with a wall 162 and radial flange 164 extending from the wall 162. The lip may be operable to wrap around a corresponding annular protrusion 136 extending from the section alignment feature 133. The annular protrusion 136 may have one or more surfaces 135 operable to contact the wall 162 and radial flange 164. As shown in FIG. 3, the one or more surfaces 135 may be horizontal, vertical, a plurality of separate transition surfaces, or curved surfaces corresponding to the shape of the wall 162 and radial flange 164. The wall 162 and radial flange 164 may correspond to and mate with the one or more surfaces 135. In response to engaging the joint section 120 and the joint section 130, the lip (wall 162 and flange 164) may be compressed between the surfaces 135 and a surface 126 located on the leading edge of the section alignment feature 123. In this way, the engagement of the first joint section 120 and the joint section 130 may also sandwich the joint boot 160 within the assembly. In this way, the ball joint assembly may be structured without a snap ring or similar retaining feature designed to secure the joint boot 160 in place relative to the rest of the assembly.

Figure 5:
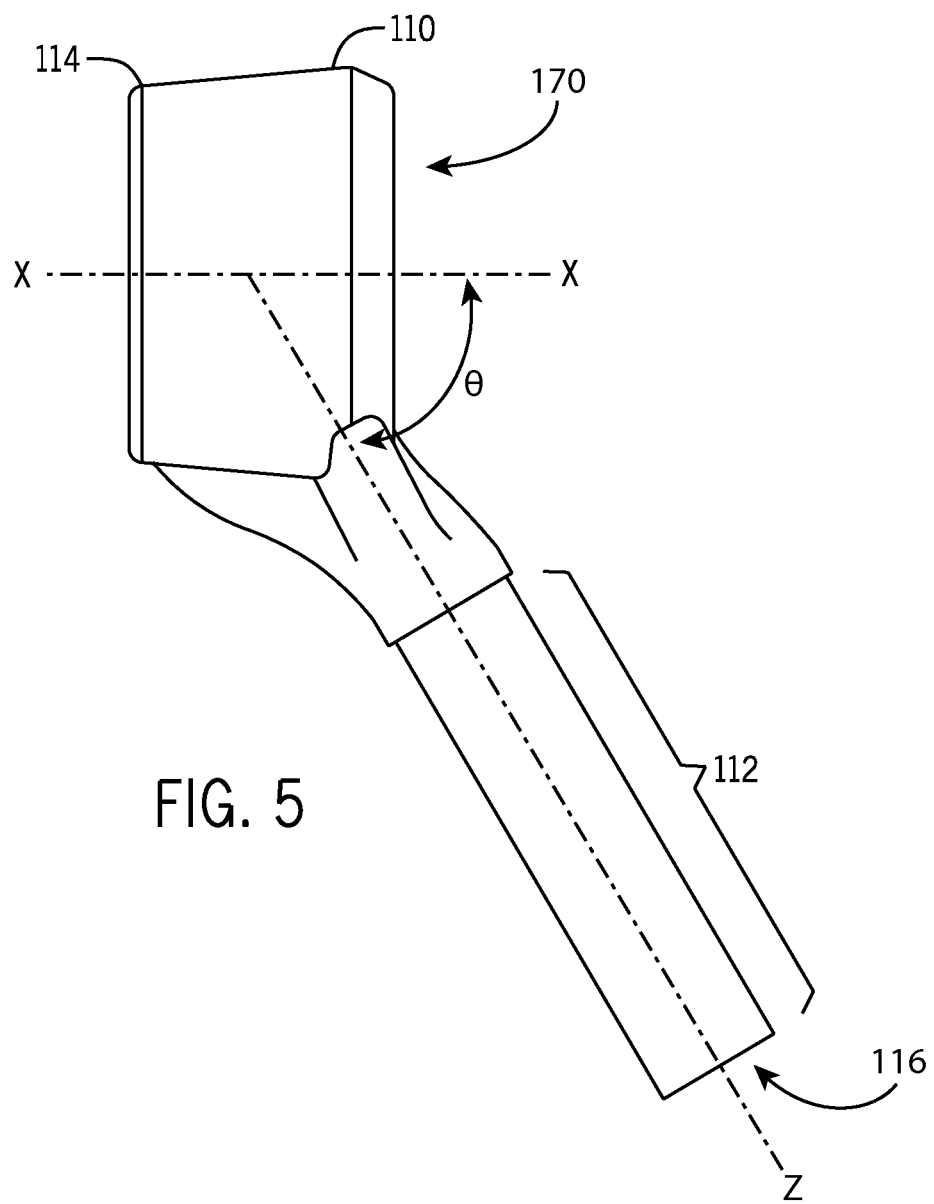
FIG. 5 is a partial view of an end-link housing for the adjustable control arm of FIG. 1.
Figure 6:
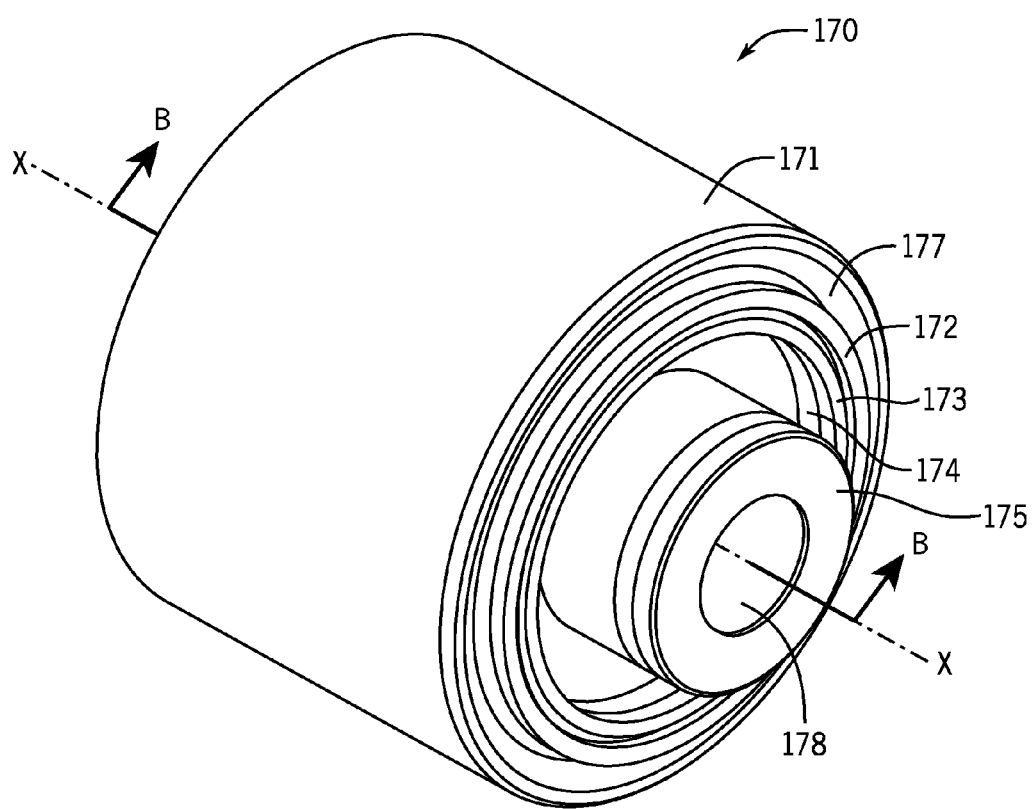
FIG. 6 shows an example of a flexible joint that may be utilized with the end-link of FIG. 5.
Figure 7:
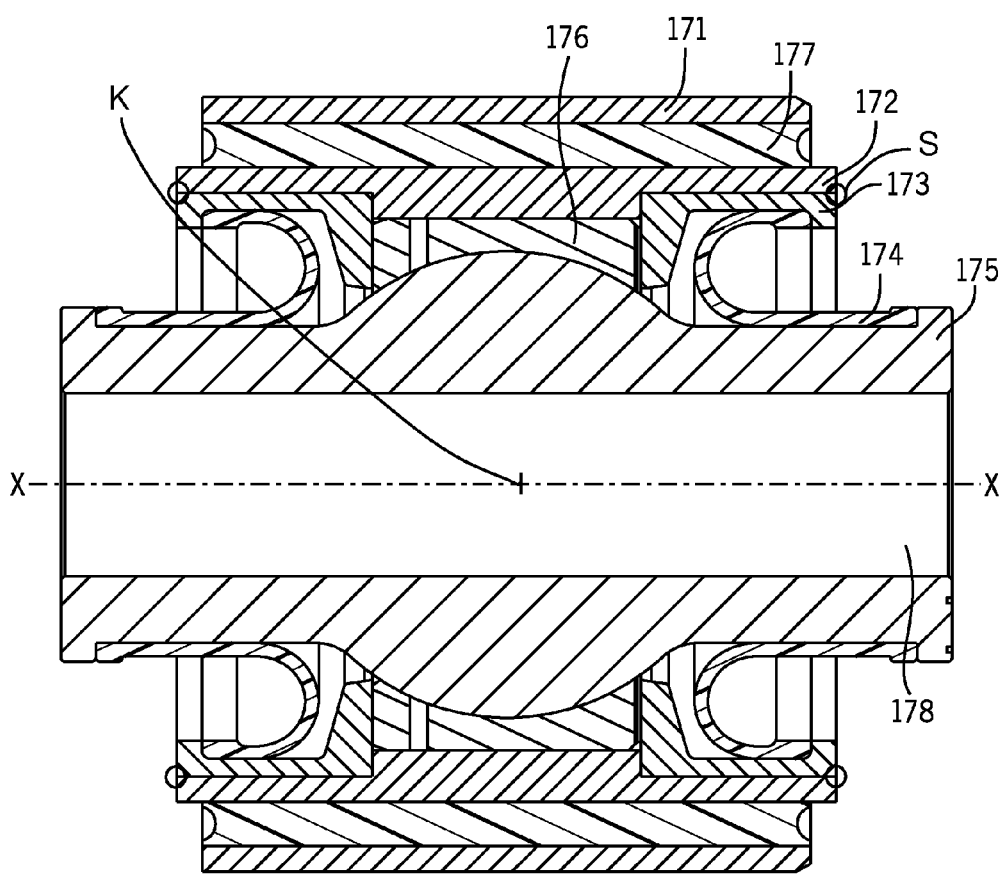
FIG. 7 is a section view of the flexible joint of FIG. 6 along line B-B.

In accordance with various embodiments, the control arms 100*a/b* may include a flexible joint 110 *a/b* as illustrated in FIGS. 1-2 and 5-7. The flexible joint 110 may be any joint operable to provide at least one of shock and vibration attenuation, misalignment, a combination of these, or other beneficial suspension characteristic. The flexible joint 110 may also connect various components of the suspension together such as other portions of the first and second control arms 100*a/b* (e.g. the links 140*a/b* or the first and second joint sections 120/130) to portions of the vehicle such as the frame. For example, the flexible joint 110 may be a bushings, ball joint (studded or cross-axis), or any other misalignment-accommodating suspension component (e.g. heim joints, jimmy joints, johnny joints, cartridge joints, uniballs, grader balls, etc.). In one example, as shown in FIGS. 5-7, a flexible joint 110 may include an end housing 114 connected to an engagement member 112. The end housing 114 may house a flexible member 170. The engagement member 112 may have a threaded end 116. The threads may be external or internal as depicted by the callout to the threaded end 116 shown in FIG. 5. The end housing 114 may have an axis X. The end housings of flexible joints 110*a* and 110*b* may also each have an axis $X_1$ and $X_2$ respectively. Axes $X_1$ and $X_2$ may be collinear, parallel, skew or any configuration relative to one another. The engagement member 112 may have an axis Z. The angle between axis X and axis Z may be θ. The angle θ may vary between applications of the control arm 100 and the type, make, and model of the car or suspension. As the control arm 100 is adjustable and the angle θ may not be, the flexible member 170 may take up any misalignment to avoid or limit binding of the components within control arm 100. As shown in FIGS. 6 and 7, the flexible member 170 may include a housing 171 surrounding a bushing 177. The bushing 177 may surround a secondary housing 172. Within the secondary housing 172 may be a bushing 176 which supports and surrounds a spherical shaft 175 for supporting a bolt or the like that may extend through the aperture 178 in the spherical shaft 175. Retaining caps 173 may be swaged (see swaged material S in FIG. 7) into either end of the flexible member 170 constraining the bushing and spherical portion of shaft 175 in the middle of the housing 171. The caps may also be retained using any of a variety of retainers such as screw-in, snap rings, retainer rings, etc. Seals 174 may engage the retaining caps 173. In one example, the seal 174 may be a boot sealing contaminants out of the flexible member 170.

In embodiments with only three spherical joints (e.g. 110a, 110b, and 150), the upper control arm 100 may transmit much more (Noise Vibration and Harshness (NVH) to the vehicle body & passengers. As such, the addition of bushing 177 may restore a sufficient amount of isolation to make the arm commercially acceptable on non-race vehicles. The bushing 177 may have just a minimal or vestigial amount of rubber or polymer material.

In accordance with various embodiments, the control arm 100 may have a link 140a which may connect the flexible joint 110a to the joint section 120. The control arm 100 may have a link 140b which may connect the flexible joint 110b to the joint section 130. In accordance with various embodiments, the link 140a and 140b may be adjustable in length. For example, it may be possible to shorten or length either one or both of the links 140 a/b. In one example, the links 140a/b may include adjustment sections 144 a/b respectively. In one embodiment, these adjustment sections may have threads on each end. These two threads have helix direction formed opposite of one another. In such an embodiment, corresponding threads on the flexible joints 110a/b (i.e. threads 116) and the threads on the joint sections 120/130 (i.e. the threads on engagement portions 129/139) would also be opposite of one another. Thus, by connecting the flexible joint 110a to the joint section 120 and the flexible joint 110b to the joint section 130, the adjustment sections 144 a/b having opposing threads on each end may function as a turn buckle being able to shorten or lengthen the length of each link 140a/b. In various embodiments the adjustment sections 144 a/b may include a plurality of flat and opposed surfaces operable to receive a wrench to rotate both threaded interfaces to affect the overall length of 100a or 100b. To limit the range of the adjustment sections 144 a/b to reliably safe amounts, grooves may be machined into the male threads to indicate the limit of adequate interface engagement at each threaded interface.

Additionally, a locking mechanism may be located at each end of the adjustment sections 144a/b. The locking mechanism may be operable to prevent or limit movement of the adjustment sections 144a/b when locked or engaged. The locking mechanism may include any fastener, mechanism or feature that performs this function. For example, the locking feature may include jam nuts, pinch clamps, integral pinch bolts, spanning slots cut into adjustment sections 144a/b, etc. In one embodiment, a pair of jam nuts 142a/b may be utilized at separate ends of the adjustment sections 144 a/b to deliberately bind the threaded interfaces to prevent or limit random in-service forces from rotating 144a/b such that the arm components might disengage from one another. Additional embodiments may employ many other design types to assure that engagement of all components is maintained while in service, such as pinch clamps, integral pinch bolts, spanning slots cut into 144a/b, etc.

Any other process or device may also be used to function as links 140a/b and the adjustment sections 144 a/b. For example, U.S. patent publication number 2012/0104713, entitled Cam-Adjustable Control Arm, incorporated herein by reference, describes control arms that utilize arm plates, slide plates and a cam to adjust the length of arms. The various structures disclosed therein may likewise be utilized to provide adjustment in the lengths of the links 140a/b.

In accordance with various embodiments, the control arm 100 may function such that the forces produced on the arm result in purely or substantially purely tensile or compressive forces on the control arms 100 a/b. In contrast to the construction of other existing adjustable 'A' arms, that translate part of their received loads into bending forces on their member components, in the various embodiments discussed herein, the bending force components in the members are reduced or eliminated by geometry the various geometries discussed herein. Because the engagement between joint sections 120 and 130 has the potential to act as a pivot point, forces in the control arms 100 a/b are substantially simplified. The adjustability of the camber and caster is also significantly simplified by merely adjusting the length of the control arms 100 a/b which, as discussed above, may have intersecting axes. The axes may intersect at or proximal the joint 150. In various embodiments, the intersection may occur anywhere in the space occupied by the volume of the joint assembly 150. In various embodiments, the intersection may occur at the effective center of the joint. Some joints may have their degree of freedom by rotating around a single axis, e.g. a pivot bushing. Since many joints that have a single degree of freedom are made with a flexible material such as an elastomer (e.g. rubber) there is still some flexibility in the other degrees of freedom. As such these joints may have an effective center that is located approximately on their single axis but is located where there flexibility would allow some ancillary movement about other degrees of freedom. Frequently, this effective center is located about midsection of the joint along the axis. However, because, the flexibility of the joint in directions that are not primarily suited to allowing rotation about this point, the effective center may not be a specific point but it may be the volume which defines any point that the joint might rotate about. As such, while it is smaller than the volume of the joint as a whole it is a larger space than what would be considered the exact point of rotation that is intended. For example, in a joint having a spherical interface, as opposed to the axial interface above, the spherical interface may be intended to rotated around multiple axis at a single point, this may be the kinematic center. But because there may still be flexibility in the general structure of the joint having the spherical interface, the effective center may be larger than the kinematic center but smaller than the volume the joint occupies. In various embodiments, the intersection may occur at the kinematic center K of the joint 150 (e.g. the intended rotational center of the spherical interface 153). These three types of intersections between the various axis and the joints may also apply to the flexible joints 110a/b.

The control arms 100*a/b* may indirectly affect the toe in, as a consequence of setting desired camber and caster. Even with use of the control arms 100*a/b* the actual toe may be corrected elsewhere such as the steering linkage to accommodate the new geometry created by adjusting the caster and camber. Due to the misalignment tolerance via the joint design present at each corner of the triangle that makes up control arm 100, the arms provide camber, caster and toe without binding or significantly limiting the potential to bind the control arm 100. The flexibility of the various corners, specifically the potential to alter angle β at the engagement between joint sections 120 and 130, allows the control arm to be adjusted without concern for the angle β between control arms 100 *a/b*. Thus the length of either control arm 100*a* or control arm 100*b* may be changed with respect to the other control arm and not cause binding because the flexibility in either the flexible joints 110 *a/b*, the joint 150, and/or the angle β may prevent or limit the potential for the components to bind. In accordance with various embodiments, the outer joint of the control arm (e.g. the connection of joint sections 120 and 130) may be moved three dimensionally by adjusting either control arm 100*a* or control arm 100*b*. This adjustment allows the outer joint to be moved forwardly, backwardly, or laterally relative to the vehicle (e.g. chasses, body, or other control arm mount). The forward, backward, or lateral adjustment may be utilized to adjust the camber, caster, or toe of a front suspension or similar characteristics on a rear suspension.

Aspects of the present invention include the use of a cam for adjusting the length of a control arm (upper or lower) for use on motor vehicle suspension systems. The cam adjustment assemblies described and depicted herein are for use in various configurations of control arms that allow a user to make various adjustments during control arm installation and/or wheel alignment. More particularly, the present invention allows a user to adjust the length of the control arm for various purposes. Although the present invention is described and depicted herein with reference to a motor vehicle suspension system, it is to be appreciated that the embodiment of the present invention can be utilized with other types of suspension systems that require control arms.

Although various representative embodiments of this invention have been described above with a certain degree of particularity, those skilled in the art could make numerous alterations to the disclosed embodiments without departing from the spirit or scope of the inventive subject matter set forth in the specification and claims. All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

We claim:

1. An adjustable control arm comprising
   a first arm having a first flexible joint and a first joint section connected by a first link that is independently adjustable in length; and
   a second arm having a second flexible joint and a second joint section connected by a second link that is independently adjustable in length;
   a joint assembly having a single joint with multiple degrees of freedom including at least a portion of the first joint section and a portion of the second joint section that connect together forming the joint assembly, with the joint assembly being operable to connect to a portion of a steering or suspension mechanism, wherein the joint assembly is positionally adjustable without incurring binding between the first arm and the second arm, the adjustment is provided by changing the length of either or both of the first link and the second link,
   wherein the first joint section includes a first joint head housing at least a portion of the joint assembly in an internal chamber, the first joint section having a first section mating surface associated with a first section alignment feature and the second joint section includes a second joint head with a second section mating surface surrounding an aperture defined by an alignment feature, the second joint head including a second section alignment feature, wherein the first section alignment feature and the second section alignment feature are engaged thereby aligning the second joint head and the first joint head and providing rotational engagement between the second joint head relative to the first joint head; and the joint assembly extends from the internal chamber and passes through the aperture.

2. The adjustable control arm of claim 1, wherein the first joint section and the second joint section are rotatable relative to one another providing adjustment of the angle between the first arm and the second arm.

3. The adjustable control arm of claim 1, wherein the first link includes an adjustment section operable to change the length of the first link.

4. The adjustable control arm of claim 3, wherein the second link includes an adjustment section operable to change the length of the second link.

5. The adjustable control arm of claim 1, wherein the first flexible joint includes a first flexible member having a spherical shaft to increase adjustability of the first arm.

6. The adjustable control arm of claim 1, wherein the first arm includes a first axis and the second arm includes a second axis, wherein the first axis and the second axis both intersect one another.

7. The adjustable control arm of claim 6, wherein the joint assembly includes a joint spherical center and the first axis and the second axis both intersect at the joint spherical center.

8. The adjustable control arm of claim 7, wherein the first axis is rotatable about the joint spherical center in response to adjusting the adjustable section of either the first link or the second link,
and the second axis is rotatable about the joint spherical center in response to adjusting the adjustable section of either the first link or the second link.

9. The adjustable control arm of claim 1, wherein the adjustment section includes opposing threads on each of its ends, wherein the threads on each end engage corresponding threads on the first joint section and the first flexible joint such that the adjustment section forms a turnbuckle between the first joint section and the first flexible joint.

10. The adjustable control arm of claim 1, wherein the first arm includes a locking mechanism operable to limit movement of the adjustment section.

11. An upper control arm joint comprising
a first joint section having a first joint head that is operable to rotate about an axis;
a second joint section having a second joint head that is operable to rotate about the axis and engage in rotational movement relative to the first joint head,
wherein the first joint section and the second joint section connect together forming a joint assembly, with the joint assembly being operable to connect to a portion of a steering or suspension mechanism and wherein the first joint head and the second joint head are each operable to receive at least one of a ball joint or a stud with the at least one of the ball joint or the stud having a central axis, wherein the axis is at least one of a steering axis or the central axis,
wherein the first joint head houses at least a portion of the joint assembly in an internal chamber, the first joint section having a first section mating surface associated with a first section alignment feature and the second joint head includes a second section mating surface surrounding an aperture defined by an alignment feature and a second section alignment feature,
wherein the first section alignment feature and the second section alignment feature are engaged aligning the second joint head and the first joint head along the axis,
wherein the joint assembly extends from the internal chamber and passes through the aperture.

12. The joint of claim 11, wherein the first joint head includes a first engagement portion which engages with a first link to form a first adjustably fixed geometry that is adjustable by manipulating the engagement between the first engagement portion and the first link and the second joint head includes a second engagement portion which engages with a second link, wherein the engagement between the second engagement portion and the second link forms a second adjustably fixed geometry that is adjustable by manipulating the engagement between the second engagement portion and the second link.

13. The joint of claim 12, wherein the first engagement portion defines a first axis and the second engagement portion defines a second axis with the first axis and the second axis intersecting.

14. The joint of claim 12, wherein the first engagement portion is a first threaded shaft which extends from a side of the first joint head and the second engagement portion is a second threaded shaft which extends from a side of the second joint head and the adjustment between the first engagement portion and the first link occurs by threading the first engagement portion into the first link and the adjustment between the second engagement portion and the second link occurs by threading the second engagement portion into the second link.

15. The joint of claim 14, wherein an angle between the first threaded shaft and the second threaded shaft is adjustable by rotating the second joint head relative to the first joint head.

16. The joint of claim 11, wherein the first section alignment feature is a cylindrical protrusion extending from the mating surface with a center aperture, wherein the joint assembly extends through the center aperture.

17. The joint of claim 16, wherein the aperture is defined by a circumferential wall and is sized to receive the first section alignment feature, wherein the circumferential wall is the second section alignment feature with the first section alignment feature and the second section alignment feature being coaxial allowing rotation between each alignment features.

18. The joint of claim 11, further comprising a joint boot sandwiched between the first joint section and the second joint section.

19. The joint of claim 18, further comprising an annular protrusion extending from the aperture, wherein the annular protrusion supports and compresses the ball joint boot against the first joint section.

20. The joint of claim 11, wherein the second joint section further includes a slot forming an extension to the aperture.

21. The joint of claim 20, wherein a second aperture is perpendicular to and extends through the slot operable to receive a pinch bolt and contract the two sides of slot together to decrease the size of the aperture to tightly fit the second section alignment feature around the first section alignment feature.

22. A method of minimizing the height of an upper control arm and ball joint comprising
providing a rotatable first arm connected to a first joint section having a first joint head and a first interior volume operable to receive a portion of a spherical portion of a ball joint;
providing a rotatable second arm connected to a second joint section having a second joint head independent of the first joint section having the first joint head, the second joint head having a second interior volume operable to receive a portion of a ball joint; and
mating the second joint head to the first joint head, with the first joint head and the second joint head forming a single interior volume that is operable to receive the spherical portion of a ball joint.

23. The method of claim 22, further comprising
locating a spherical portion of a ball joint within the single interior volume formed by the first joint head which is internally contained within the volume of the second joint head.

24. The method of claim 23, wherein the first joint head is rotatable relative to the second joint head about an axis passing through the center of the spherical portion of the ball joint.

* * * * *